Sept. 29, 1970  HISASHI HAMANO  3,530,687
METHOD AND APPARATUS FOR MANUFACTURING KNITTED CLOTH
HAVING PILE CONFIGURATION
Filed Aug. 10, 1967  6 Sheets-Sheet 5

United States Patent Office 3,530,687
Patented Sept. 29, 1970

3,530,687
METHOD AND APPARATUS FOR MANUFACTURING KNITTED CLOTH HAVING PILE CONFIGURATION
Hisashi Hamano, Soka-shi, Japan, assignor, by mesne assignments, to International Kniflok Corporation, New York, N.Y., a corporation of New York
Filed Aug. 10, 1967, Ser. No. 659,669
Claims priority, application Japan, Oct. 14, 1966, 41/67,212
Int. Cl. D04b 23/08
U.S. Cl. 66—84
2 Claims

ABSTRACT OF THE DISCLOSURE

An improved production method and apparatus for manufacturing pile knitting cloth characterized by using flexible pile wires for the purpose of guiding piles in stable condition during the knitting operation, thereby interlocking the piles in predetermined arrangement and shape with yarns composing the basic knitted cloth, devices and methods for heat setting and cutting the piles to produce a material provided with material engaging surface comprising configuration of pile knitting of the invention.

---

Figure 1:
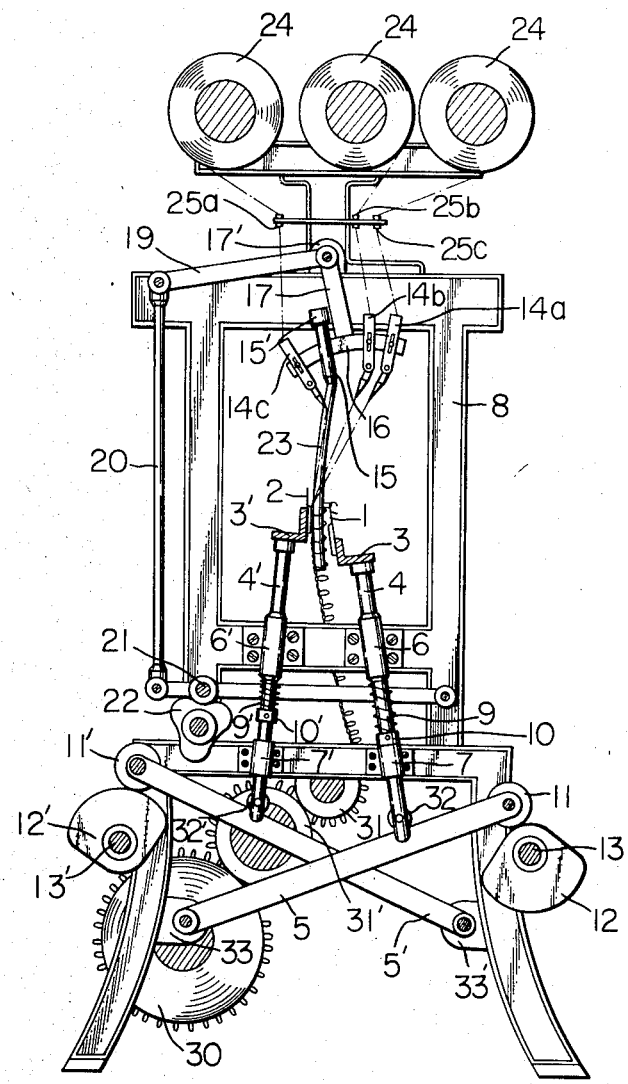

The present invention relates to an improved method and apparatus for manufacturing knitted cloth provided with pile configurations, more particularly relates to an improved method and apparatus for manufacturing knitted cloth provided with pile configurations characterized by applying flexible pile wires to define a plurality of piles in a predetermined arrangement and shape on a basic knitted cloth by a simple operation.

In the conventional method of producing weft knitted pile cloth, it was necessary to carry out the interlocking of pile yarn with basic knitting yarns using beard needles together with special sinkers or using more than two different types of latch needles operating in combination.

In the case of the conventional warp knitted pile cloth, the formation of piles are carried out by using a plurality of straight needles disposed against latch needles arranged in a row and whose knitting motion is actuated by a suitable cam mechanism.

With any of the conventional methods, it was difficult to produce piles interlocked with the basic knitted cloth in a predetermined arrangement and shape at high production speed and in a simple way.

It is possible to produce a fancy knitted cloth having excellent color effect caused by using variously colored yarns as pile yarns in the present invention at low production cost. It is also possible to produce a figured knitted cloth by forming a part of pile yarns in a predetermined arrangement and shape using the flexible pile wire of the present invention, while maintaining remained part of pile yarns in free condition. Further, it is a distinguishing feature of the present invention that such a special pile knitted cloth can be used very well as a member having a material-engaging surface by cutting at least a part of the piles thereon interlocked. In such a case, it is necessary for the piles to be in predetermined arrangement and shape to permit complete cutting operation. It has been difficult to obtain predetermined arrangement and shape of piles interlocked with the basic knitted cloth by the previously-mentioned conventional method, particularly in case rigid materials are used as the pile yarns.

The principal object of the present invention is to provide a method and apparatus for producing a knitted material provided with improved pile configurations interlocked with the basic knitted cloth in a predetermined arrangement and shape.

Another object of the present invention is to provide a method and apparatus for producing a knitted material provided with improved pile configurations at high production efficiency and low cost.

A further object of the present invention is to provide a method and apparatus for producing a knitted material provided with fancy pile configurations having excellent color effect at low production cost.

A still further object of the present invention is to provide a method and apparatus for producing a knitted material provided with improved pile configurations interlocked with the basic knitted cloth, which can be preferably used for making an element having a material-engaging surface.

Further features and advantages of the present invention will be apparent from the ensuing description with reference to the accompanying drawings to which however the scope of the invention is in no way limited.

Figure 2:
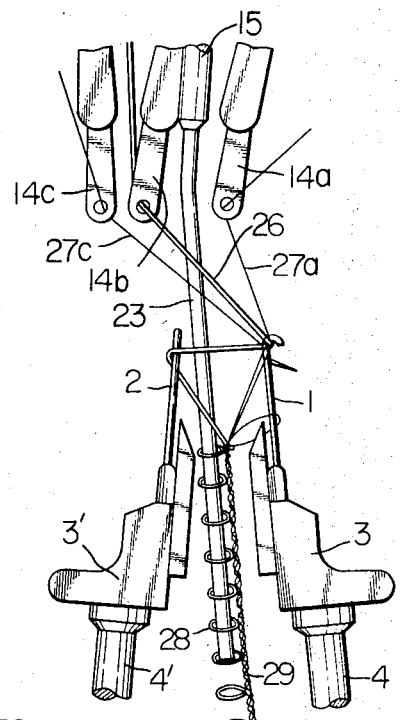
Figure 3:
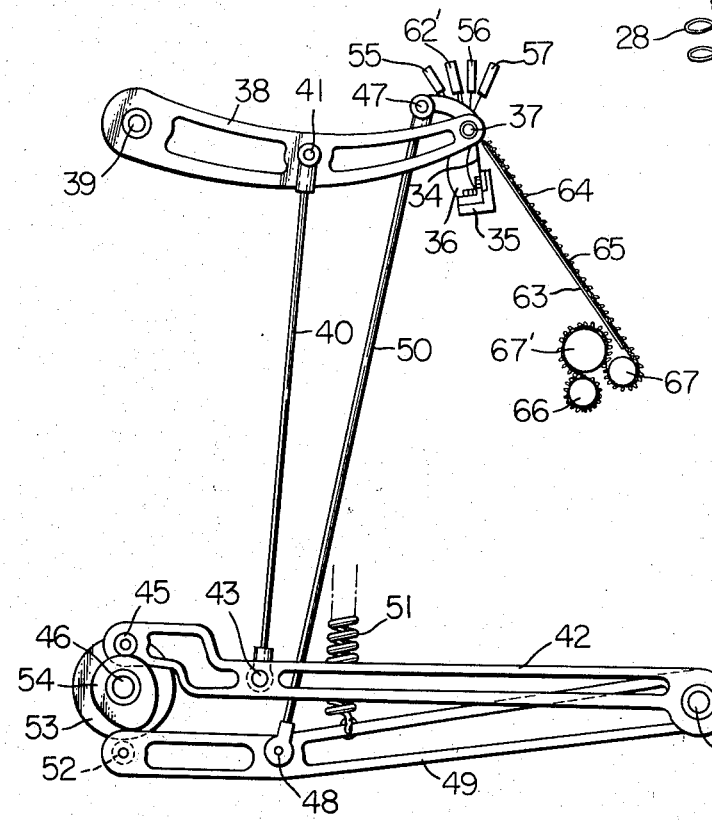
Figure 4A:
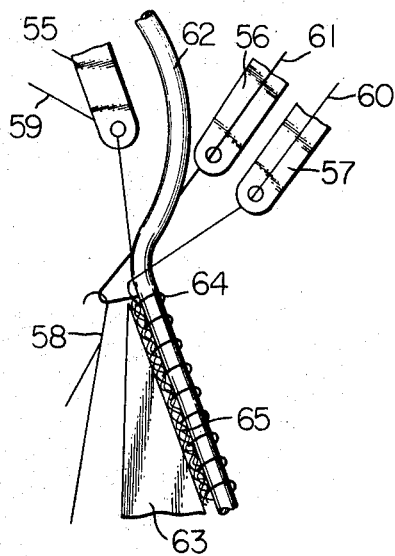
Figure 4B:
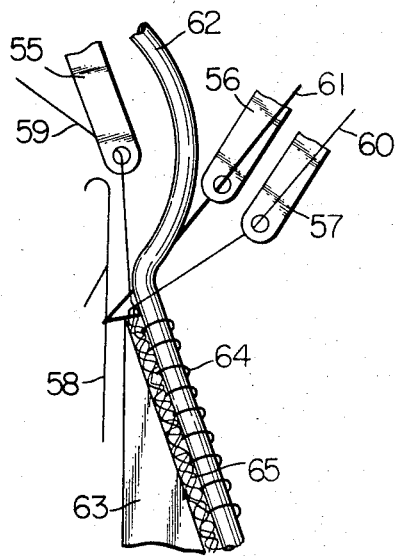
Figure 4C:
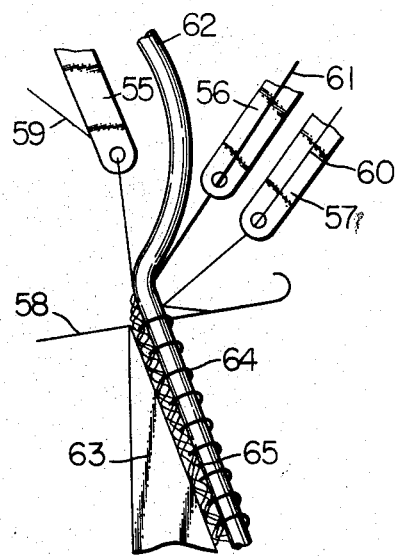
Figure 4D:
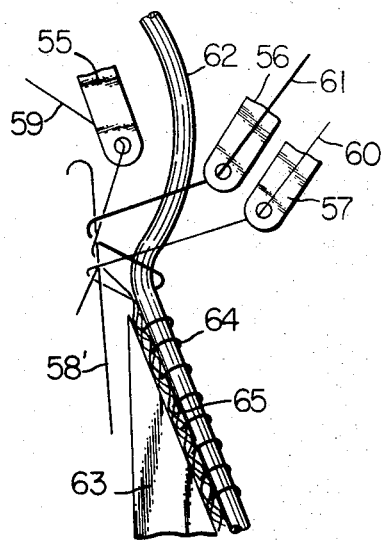
Figure 4E:
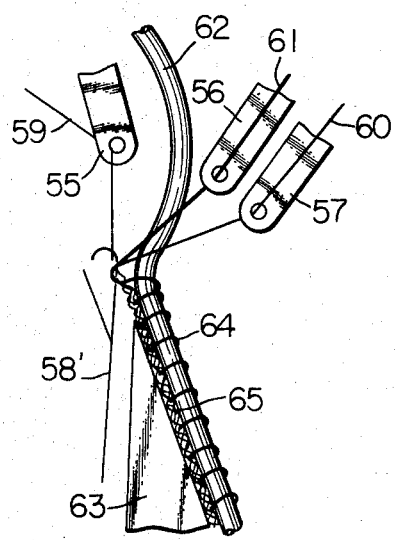
Figure 4F:
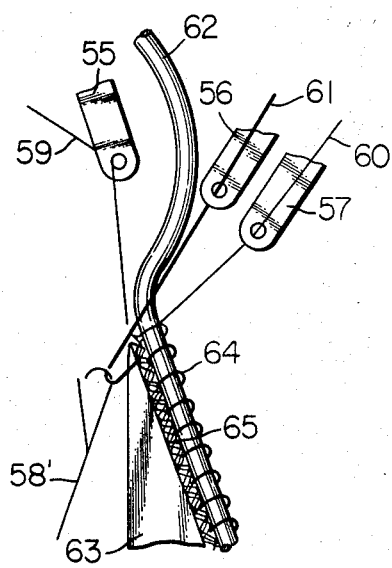
Figure 4G:
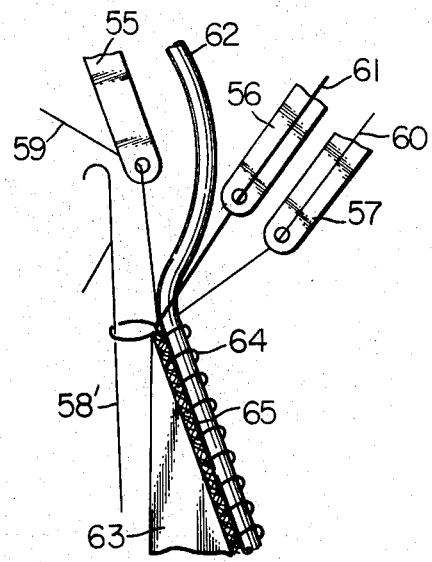
Figure 4H:
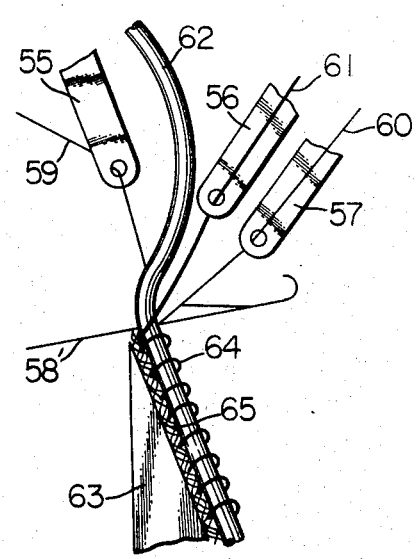
Figure 5A:
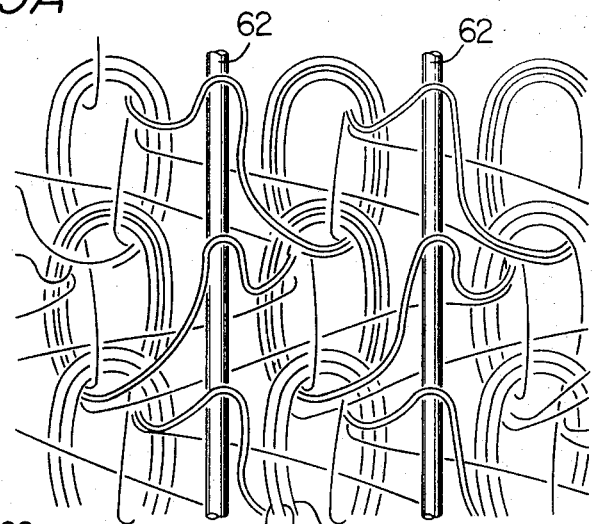
Figure 5B:
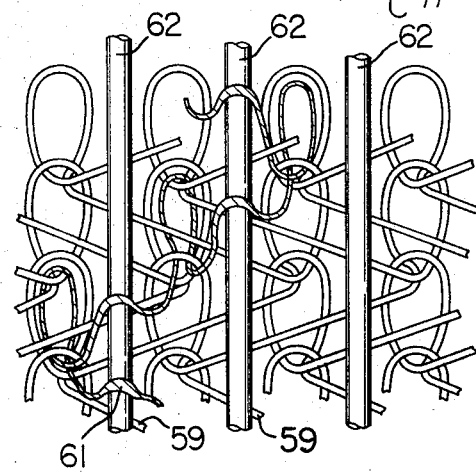
Figure 6:
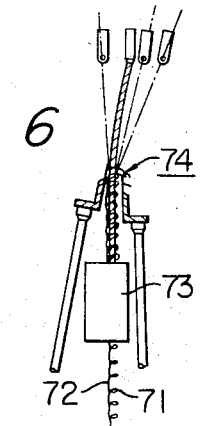
Figure 7:
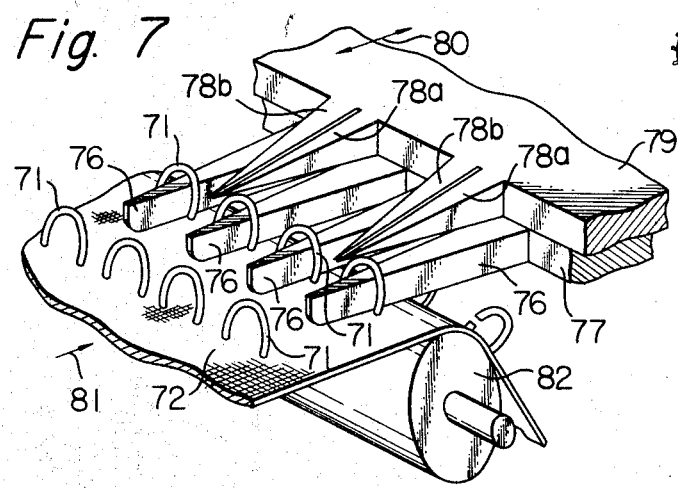
Figure 8A:
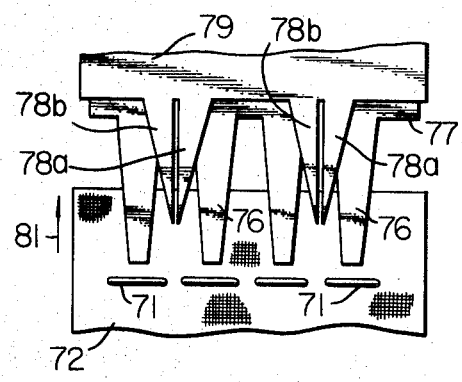
Figure 8B:
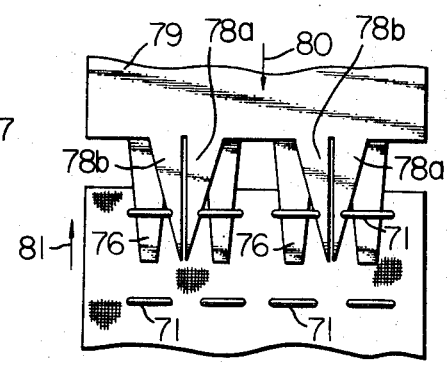
Figure 9:
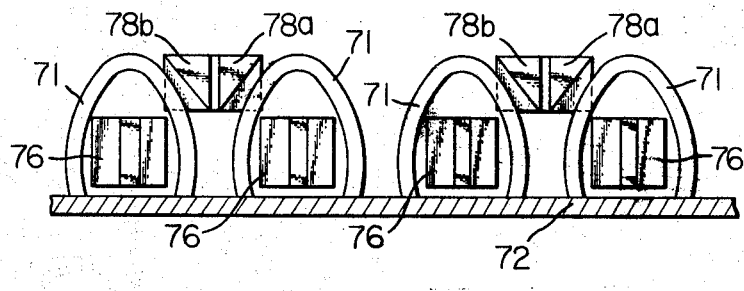

FIG. 1 is a side view of an embodiment of the present invention showing the main mechanism of the apparatus, FIG. 2 is an enlarged side view of the needle portion of the apparatus shown in FIG. 1, FIG. 3 is a side view of another embodiment of the apparatus showing the main mechanism of the invention, FIGS. 4A to 4H are explanatory drawings showing the knitting operation of the apparatus shown in FIG. 3, FIGS. 5A and 5B are schematic plan views of warp knitting using a pile wire according to the present invention, FIG. 6 is a schematic view showing the heat-setting mechanism for the apparatus according to the invention, FIG. 7 is a perspective view of a pile-cutting device used for cutting the pile according to the present invention, FIGS. 8A, 8B and 9 are plan and front views showing the cutting operation of the pile-cutting device shown in FIG. 7.

Referring to FIG. 1, the mechanism of the apparatus of an embodiment of the present invention is shown, wherein the knitting operation of the basic knitted cloth having piles is carried out in the same manner as the ordinary Raschel loom.

A plurality of latch needles 1 and a plurality of straight needles 2 are mounted on the horizontal needle beds 3, 3', respectively. The needle beds 3 and 3' are mounted on the top ends of the respective supporting rods 4, 4' in such a way that the respective needle beds 3 and 3' are transversely disposed in the apparatus in the same manner as the conventional warp knitting machine. Sliding rolls 32, 32' are rotatably disposed to the bottom end of the supporting rods 4, 4', respectively, and the sliding rolls 32, 32' ride on the middle portion of a pair of lifting levers 5, 5', respectively. These supporting rods 4, 4' are slidably supported by supporting brackets 6, 6', 7, 7' secured to the machine frame 8 and are provided with springs 9, 9' and collars 10, 10' which actuate the downward movement of the supporting rods 4, 4'. One end of each of the lifting levers 5, 5' is turnably mounted on the supporting brackets 33, 33' of the machine frame 8 while the other end is provided with cam balls 11 and 11', contacting with needle bar cams 12 and 12', respectively, which are secured to the cam shafts 13, 13'. The shapes of the needle bar cams 12, 12' are the same but the cams 12, 12' are secured to the respective cam shafts 13, 13' in such a way that the phase difference between cams 12 and 12' is 180°.

By means of this needle motion mechanism, as the needle bar cams 12, 12' rotate, the lifting levers 5, 5' oscillate around the supporting brackets 40, 40' respectively, and this oscillation of the lifting arms 5, 5' are converted into the up and down reciprocating movement of the needle bed supporting rods 4, 4'. Consequently, various types of up and down reciprocating movements of the needles 1 and 2 can be obtained in accordance with the required structure of the knitted fabric by selecting the shape of needle bar cams 12, 12'.

A plurality of yarn guide bar assemblies composed of bars 14a, 14b, 14c are adjustably mounted on a supporting bracket 16 which is transversely disposed upon the needle beds 3, 3' and rigidly supported by a pair of upper swing levers 17. The upper swing levers 17 are pivotably mounted to the respective supporters 17'. The supporter 17' is slidably mounted on the frame 8 in such a way that the supporter 17' can slide in the transverse direction by a shifting means (not shown) composed of a cam mechanism and one of the swing lever 17 is connected to a lower swing lever 18 by means of a link mechanism composed of 19 and 20 which are pivotably connected to each other. The lower swing lever 18 is pivotably mounted on the machine frame 8 at one of its end and is provided with a cam ball 21 contacting with a yarn guide bar cam 22. Thus the swing motion of the lower swing lever 18 due to the rotation of the guide bar cam 22 is converted into the to and fro swing motion of the yarn guide bar assembly supported by the upper swing lever 17. By selecting the shape of the yarn guide bar cam 22 and cam of the transverse shifting means of the supporter, various types of the to and fro swing motions together with the transversal motion can be bestowed to the yarn guide assembly in relation with the up and down movement of the needles 1 and 2. A plurality of pile wires 23 are secured at their upper ends to the respective pile wire holders 15 which are secured to a pile wire supporter 15' mounted on the machine frame 8. The pile wire holders 15 are positioned at the intervened position between two adjacent bars 14a. The bottom ends of the pile wires 23 are left in a free condition in such a way that the pile wires 23 also hang down through the intervened space between the adjacent pair of needles 1 and 2.

Yarns for knitting basic cloth and piles are supplied from the yarn beams 24 mounted on the machine frame 8 and fed to the yarn guide bar assemblies through the respective yarn guides 25a, 25b and 25c.

The process of interlocking piles with the yarn of the basic knitted cloth by the apparatus of the present invention is shown in detail in FIG. 2.

A pile yarn 26 and basic knitting yarns 27a and 27c are led to the operating position of the latch needles 1 and the straight needles 8 by the respective yarn guide bars 14a, 14b and 14c. By means of the combined operation of the yarn guide bars 14a, 14b and 14c, swinging to and fro, and shifting transversely, and of the needles 2 moving up and down, piles 28 are interlocked successively onto the knitted basic cloth 29 in such a way that each pile 28 is interlocked with the basic loops of yarn sliding over the stationary pile wire 23. Consequently, the piles 28 produced are held in a predetermined arrangement and upright condition by the pile wire 23. As the knitting operation progresses, the piles 28 are carried downwards along the pile wire 23 together with the basic knitted cloth 29 and finally, the piles 28 are released from the pile wire 23 and left in a free condition with the base portions interlocked with the basic loops of yarn forming the basic knitted cloth 29. As the piles 28 are held positively while they are still in an unstable condition just after being formed by the needles, piles produced can be interlocked tightly with the basic loops of yarn forming the basic knitted cloth in a predetermined arrangement and shape. After the knitting operation, the knitted product having a plurality of piles thereon is taken up by a suitable cloth roller 30 positioned at the lower portion of the apparatus by way of rotating switch rollers 31 and 31'.

Another embodiment of the apparatus of the present invention is shown in FIG. 3, wherein the guide bars and the pile wires are shifted reciprocally by a transverse mechanism and the needle member is bestowed a combined swing and up and down motion, and the straight needles 2 in the first embodiment are omitted. The mechanism of the combined swing up and down motion of latch needles 34 are clearly shown in FIGS. 3 and 4A to 4H. A needle bar 35 is rigidly mounted on a lever 36. A pin 37 is disposed at a middle portion of the lever 36 so as to turnably support the lever 36 around it. An end of an upper lever 38 is turnably supported by a shaft 39 and the other end of the upper lever 38 turnably supports the pin 37. At the middle portion of the upper lever 38 an upper end of a connecting rod 40 is turnably connected with the upper lever 38 by a pin 41 while the lower end of the connecting rod 40 is turnably connected with the middle portion of a lower lever 42 by a pin 43. The lower lever 42 is turnably supported by a shaft 44 at one of its ends, and a small roll 45 is disposed at the other end of the lower lever 42. The roll 45 is displaced up and down by contacting with a cam 54 secured to a shaft.

A pin 47 is mounted on an end of the arm 36 of the needle bed 35, and connected with the connecting pin 48 disposed to the middle portion of a lower lever 49 by a connecting rod 50. The lower lever 49 is turnably mounted on shaft 44, and is always pulled upward by a spring 51. A small roll 52 disposed to one end of the lower lever 49 always contacts with a cam 53 secured to the shaft 46.

In the above-mentioned cam-link mechanism, when the shaft 46 rotates, the cams 53 and 54 are rotated respectively, thereby the levers 42 and 49 swings around the shaft 44. The above-mentioned swing motion of the levers 42 and 49 are transmitted to the upper members of the respective cam mechanisms, that is, the upper lever 38 swings around the shaft 39, thereby the needle bar 35 connected with the end of the lever 38 by the pin 37 is displaced upward and downward reciprocally, consequently, the latch needles are displaced upward and downward reciprocally. The motion of the latch needle 34 is shown in FIGS. 4A and 4B. By the above-mentioned motion of the cam mechanism, swing motion of the lever 49 around the shaft 44 is transmitted to the arm 36 through the connecting rod 50, the arm 36 swings around the pin 37, thereby the needle bar 35 is turned around the pin 37 reciprocally. The turning motions of the latch needles 34 are shown in FIGS. 4C to 4H. During the above-mentioned reciprocal motion of the latch needle 34, the guide bars 55, 56 and 57 move reciprocally in the lateral direction, which motion is almost the same as in the case of the conventional warp knitting machine.

The combined knitting motion of the guide bars 55, 56 and 57, latch needles 58 is shown in FIGS. 4A, 4B, 4C, 4D, 4E, 4F, 4G, and 4H. Yarns 59 and 60 for basic knitted cloth are led to the guide bars 55, 57 and a pile yarn 61, such as monofilament of synthetic fiber, metallic filament, etc. is led to the guide bar 56. A plurality of pile wires 62 are fixed to the respective holder 62' in such a way that the pile wires 62 extend downward and the lower end of the pile wires 62 are disposed in a free condition on a guide plate 63. The number of the pile wires 62 corresponds to the number of the courses of piles of the knitted material on the apparatus. The pile wire holders 62' are rigidly disposed in the machine. As shown in FIG. 4A, the latch needles 58 are disposed at the left side of the guide plate 63 with an intervening space, and the up and down motion together with the swing motion of the latch needles 58 are bestowed to there. In FIG. 5A, an example of the pattern of the knitted fabric by the knitting motion as shown in FIGS. 4A, 4B, 4C, 4D, 4E, 4F, 4G, and 4H is shown. The yarns 59, 60 form the basic knitted cloth and the pile yarn 61 is interlocked with the loops of the yarns 59 and 60 in such a way that the pile yarn 61 forms itself over the respective pile wires 62.

The relative position between the guide bar 56 for the pile yarn 61 and the pile wire 62 are changed so as to form the pile yarn 61 over the pile wire 62 by the transverse shifting motions of the guide bar 56 which shifts laterally each course. That is, the latch needle 58 interlocks piles 64 with the basic configuration of the basic knitted cloth, then the adjacent latch needles 58' knit the basic knitted cloth 65 together with the piles 64, and thereafter the pile yarn 61 forms itself over the pile wire 62, and is interlocked with the loops of the adjacent course of the basic knitted cloth 65.

In the above-mentioned example, two basic yarns are used for manufacturing the knitted basic cloth, however, if the basic yarn 60 is omitted, the type of pile knitted cloth as shown in FIG. 5B can be obtained.

Other configurations of the pile knitted fabric according to the present invention can be obtained by changing the number of guide bars, or motion of the guide bars, or mode of arrangement of the pile wires 62.

By the above-mentioned knitting operation, the piles 64 are held in a predetermined arrangement and upright condition by the pile wires 62. As the knitting operation progresses, the piles 64 are carried along the pile wires 62 together with the knitted basic cloth 65 and finally, the piles 64 are released from the pile wires 62 and left in a free condition with the base portion interlocked with the basic loops of yarn forming the basic knitted cloth 65 in the same manner as in the first embodiment of the present invention. The pile knitted cloth produced is taken up by a cloth roller 66 by way of switch rollers 67, 67'.

The knitted cloth having a plurality of piles of the present invention can be suitably used as a member having material-engaging surface such as a hooking element for a separable fastener, a hair curler and a skid-proof tape. The conventional type of such a member having material-engaging surface has been provided by cutting a port of piles of a woven pile cloth such as terry or velvet type cloth. However, such a woven material with material-engaging surface as mentioned above, has many disadvantages such as poor flexibility and heavy weight due to dense construction.

Examples of production methods and equipment of knitted material with material-engaging surface embodying the present invention are shown in FIGS. 6, 7, 8A, 8B, and 9. In order to cut piles uniformly, it is desirable to fix the piles onto the basic knitted cloth in a predetermined arrangement and shape before the cutting operation. This fixation of piles can be effectively carried out by using knitting yarns made of materials of highly heat-shrinkable property and heat-setting them while they are maintained in a predetermined arrangement and shape just after the knitting operation by means of the pile wire of the present invention.

Referring to FIG. 6, an example of heat-setting system in case of the knitting machine shown in FIG. 1 is shown, wherein the piles 71 are interlocked to the basic knitted cloth 72 while they are passing through a heat-setting zone 73 positioned in the passageway of the knitted cloth 72 from knitting zone 74 to the take-up zone 75. Thus the piles 71 are secured in a predetermined arrangement and shape onto the knitted basic cloth 72 by heat-setting them together while they are still held by a pile wire of the present invention. While, in this example, heat-setting of the knitted material is carried out successively following the knitting operation, it is also possible to separate the knitting operation and the heat-setting operation. In this case, it is necessary to use pile wires made of a material which can be dissolved by a certain chemical solvent to supply such pile wires endlessly through the pile wire holder to the knitted material from a suitable pile wire package positioned above the needle portion. This knitted material containing the pile wires with piles looped thereon is treated with a chemical solvent to dissolve and remove the pile wires after the knitting and heat-setting operations.

A more practical method for securing the piles onto the basic knitted cloth is constituted by permanently setting the interlocked condition of the piles 71 with basic loops of the basic knitted cloth 72 by using a thermoplastic resin. To obtain the above-mentioned stable condition of piles 71, first, the knitted cloth 72 is coated by a thermoplastic resin in a liquid form, then heat-treated so as to bond the pile yarns firmly together with the basic knitting yarn by means of the hardened resin.

An example of a cutting device is shown in FIG. 7. The cutting device comprises a plurality of bars 76 which are disposed to a stationary supporting member 77 in a parallel condition for holding the piles 71 in an upright condition during the cutting operation, a plurality of cutter blades 78a, 78b for cutting a certain part of piles 71 held by the bars 76 which are disposed to a movable cutter holder 79 in a parallel condition and which are moving reciprocatingly in the direction shown by arrow 80 in the drawing, and a mechanical means for actuating the reciprocating movement of the movable cutter holder 79 repeatedly. A plurality of piles 71 already secured onto the basic knitted cloth in the method already described is carried towards the cutting device as shown by arrow 81 in FIG. 8A by means of a suitable conveying means such as a friction roller 82, and each pile 71 is caught by the respective bar as it moves further, as shown in FIG. 7. Simultaneously, the movable cutter holder 79 advances towards the front end portion of the bars 76 together with the cutter blades 78a, 78b and finally, the cutter blades 78a, 78b come in contact with the piles 71 already held in an upright condition by the bars 76, as shown in FIG. 9. The movable cutter holder 79 advances further, the cutter blades 78a, 78b supported by the movable cutter holder 79 cut a certain part of the respective pile 71 as shown in FIG. 8B. The cutting device described above can be installed by attaching it to the knitting machine shown in FIGS. 1 and 3 or it can be installed independently in accordance with the requirement in the practical production process.

While the invention has been described in conjunction with certain embodiments thereof it is to be understood that various modifications and changes may be made without departing from the spirit and scope of the invention.

What is claimed is:

1. A process for manufacturing a warp knitted fabric having on one side a multiplicity of upstanding hook-like elements suitable for repeated face-to-face engagement and disengagement with a member having a multiplicity of upstanding loop elements comprising:
    (a) feeding at least two yarns to needle means, one of said yarns being a base yarn and another of said yarns being a heat-settable monofilament pile yarn,
    (b) actuating said needle means for knitting a basic multiple course knitted cloth from said base yarn and said pile yarn, knitting-in said base yarn together with said pile yarn by lapping motion to form warp knit loops firmly interlocked with the basic knitted cloth, passing said pile yarn over a pile wire, which is parallel to the wale and has a free end spaced a distance from the needle means, to form loop pile, and knitting-in said loop pile within a subsequent course of the basic knitted cloth to form warp knit loops firmly interlocked with the basic knitted cloth,
    (c) maintaining said loop piles on the pile wire and progressively sliding the loops along the wire toward the free end,
    (d) heat-setting the loops while on the pile wire to orient the loops with their openings facing the wale of the basic knitted cloth, and
    (e) cutting the heat-set loop pile and forming said hook-like members which are knitted within the basic knitted cloth such that they are not separated there-from by repeated cycles of engagement and disengagement.

2. Apparatus for manufacturing a warp knitted fabric having on one side a multiplicity of upstanding hook-like elements for repeated face-to-face engagement and disengagement with a member having a multiplicity of upstanding loop elements which comprises:
  (a) a needle bar carrying spaced latch needles,
  (b) an elongated pile wire extending adjacent to said needles and parallel to the fabric wale, means supporting said wire at one end, the other end being free,
  (c) means actuating said needle bar for imparting to said needles reciprocal movement in a plane substantially parallel to the plane of said elongated pile wire and rotational movement about an axis perpendicular to said plane to knit said fabric,
  (d) yarn guide bars for feeding at least two yarns to said needles, one of said yarns being a base yarn and another of said yarns being a heat-settable monofilament pile yarn,
  (e) means actuating said guide bars for shog movement,
  (f) actuating means for moving said needle bar and said yarn guide bars in relation to each other about said pile wire to knit a basic multiple course loop pile knitted cloth from said base yarn and said pile yarn,
  (g) heating means for heat-setting said loop pile on said pile wire,
  (h) cutting means comprising a plurality of stationary parallel bars and an equal number of movable cutting blades parallel with said stationary bars; said blades arranged in vertical axial alignment with said stationary bars,
  (i) means cooperating with said pile wire for moving said loop pile toward the free end of said pile wire, past said heating means, and onto the front portion of said stationary bars and towards said cutting blades, and
  (j) means for reciprocally driving said cutting blades in a path parallel to said stationary bars to cut said loop pile.

References Cited
UNITED STATES PATENTS

| | | | |
|---|---|---|---|
| 1,218,212 | 3/1917 | Saupe | 66—87 |
| 1,758,665 | 5/1930 | Hofner | 66—147 |
| 1,796,579 | 3/1931 | Rupf | 66—87 XR |
| 2,020,694 | 11/1935 | Mauritsch et al. | 66—147 |
| 2,273,246 | 2/1942 | Anderson | 66—87 |
| 2,301,703 | 11/1942 | Humphreys | 66—147 XR |
| 2,485,230 | 10/1949 | Alexander et al. | |
| 2,594,521 | 4/1952 | Tingley. | |
| 2,601,770 | 7/1952 | Goldsmith | 66—147 XR |
| 2,802,355 | 8/1957 | Clark et al. | 66—85 |
| 2,931,197 | 4/1960 | Newman | 66—84 |
| 2,933,797 | 4/1960 | DeMestral | 26—9 |
| 2,976,705 | 3/1961 | MacCaffray | 66—85 |
| 3,009,235 | 11/1961 | DeMetral | 26—9 XR |
| 3,083,737 | 4/1963 | DeMestral | 26—9 XR |
| 3,092,985 | 6/1963 | Matthews | 66—84 |
| 3,015,223 | 1/1962 | Moore | 66—147 |
| 3,154,837 | 11/1964 | DeMestral | 26—2 XR |
| 3,205,684 | 9/1965 | Liebchen | 66—87 |
| 3,221,520 | 12/1965 | Bassist | 66—87 |
| 3,253,426 | 5/1966 | Mauersberger | 66—84 |
| 3,309,900 | 3/1967 | Wunsch et al. | 66—85 |
| 3,333,441 | 8/1967 | Soussloff et al. | 66—147 |
| 3,367,333 | 2/1968 | Scheier | 66—85 XR |
| 2,529,541 | 11/1950 | Crawley | 66—147 XR |
| 2,717,437 | 9/1955 | DeMestral | 28—72 XR |
| 3,140,592 | 7/1964 | Clark | 66—85 |
| 3,234,971 | 2/1966 | Horne et al. | 28—72 XR |

FOREIGN PATENTS

| | | |
|---|---|---|
| 45,009 | 4/1966 | Germany. |
| 45,796 | 2/1966 | Germany. |
| 1,088,657 | 9/1960 | Germany. |
| 1,074 | 2/1888 | Great Britain. |

RONALD FELDBAUM, Primary Examiner

U.S. Cl. X.R.

26—9; 28—72; 66—86, 147, 192, 195